United States Patent [19]

Loveland

[11] Patent Number: 4,478,088

[45] Date of Patent: Oct. 23, 1984

[54] FLOWMETER SYSTEM WITH ULTRASONIC ENERGY IMPROVEMENT IN EQUILIBRATION

[75] Inventor: Robert S. Loveland, West Covina, Calif.

[73] Assignee: The Perkin-Elmer Corporation, Norwalk, Conn.

[21] Appl. No.: 451,910

[22] Filed: Dec. 21, 1982

Related U.S. Application Data

[63] Continuation of Ser. No. 224,785, Jan. 13, 1981, abandoned.

[51] Int. Cl.³ .............................................. G01F 1/66
[52] U.S. Cl. ............................................... 73/861.28
[58] Field of Search ........... 73/861.27, 861.28, 861.29, 73/861.31

[56] References Cited

U.S. PATENT DOCUMENTS

| | | | |
|---|---|---|---|
| 2,724,269 | 11/1955 | Kalmus | 73/861.28 |
| 2,746,291 | 5/1956 | Swengel | 73/861.29 |
| 2,921,467 | 1/1960 | Hedrich et al. | 73/861.27 |
| 4,164,865 | 8/1979 | Hall et al. | 73/861.28 |

*Primary Examiner*—Herbert Goldstein
*Attorney, Agent, or Firm*—Thomas P. Murphy; Edwin T. Grimes

[57] ABSTRACT

A flowmeter system and method comprising device defining a path for the flow of a fluid medium therethrough, first and second spaced apart transducers disposed along said flow path for generating acoustic compression waves (energy) in the flow medium between the transducers with increased transmission times and occurring immediately following the cessation of transmission of the other transducer, and circuitry means for measuring the phase difference in the received acoustic compression waves relative to that transmitted and for producing sum and difference voltage signals dependent upon the sum and differences of the two measured phase differences, the length of time for the generation of energy in the fluid being long enough to allow the energy to equilibrate and to allow more time after initiation of transmission before measurement of the phase difference and the purpose of having the second transmitter generate energy immediately following the cessation of the generation of the prior transducer is to swamp out the energy generated by the prior transmission. The system is a phase lock loop transmitter receiver system and also includes circuitry for automatically adjusting the frequency of the acoustic compression waves so that a constant compression wave length is maintained and for producing signals indicative of the direction and magnitude of the flow of the medium in the flow path as well as changes in composition of the medium.

8 Claims, 3 Drawing Figures

FLOWMETER SYSTEM WITH ULTRASONIC ENERGY IMPROVEMENT IN EQUILIBRATION

This application is a continuation of application Ser. No. 224,785, filed Jan. 13, 1981 now abandoned.

RELATED APPLICATIONS

U.S. Application for Patent entitled "Flowmeter System with a Synchronous Clock for Generation of Timing Signals" by R. S. Loveland, filed even date herewith, Ser. No. 224,783, Now U.S. Pat. No. 4,345,479.

U.S. Application for Patent entitled "Flowmeter System With Improved Dynamic Range" by R. S. Loveland, filed even date herewith, Ser. No. 224,725, now abandoned.

U.S. Application for Patent entitled "Flowmeter System With Improved Loop Gain" by R. S. Loveland, filed even date herewith, Ser. No. 224,734, now U.S. Pat. No. 4,372,167.

U.S. Application for Patent entitled "Flowmeter System with Digital Phase Shifter and Calibration" by R. S. Loveland, filed even date herewith, Ser. No. 224,723, now Pat. No. 4,372,166.

BACKGROUND OF THE INVENTION

This invention relates to acoustical flowmeter systems and is particularly directed to an improvement in the acoustical flowmeters of the type described and claimed in the U.S. Pat. No. 4,003,252 entitled "Acoustical Wave Flowmeter" by E. J. DeWath which issued Jan. 18, 1977 and the flowmeter system of the type described and claimed in the U.S. Pat. No. 4,164,865 entitled "Acoustical Wave Flowmeter" by L. G. Hall and R. S. Loveland which issued Aug. 21, 1979.

The invention of DeWath was directed to a flow meter having an unobstructed tubular wall thereby eliminating all impediments to the flow path of the fluid and eliminating all cavities in which debris might collect. The advantages of such a configuration is fully set forth in the DeWath Patent. To measure flow of a selected fluid in the DeWath flowmeter, however, required a calibration for that particular fluid and required a recalibration if the flow of a different fluid was to be measured since the flowmeter was not responsive to changes in fluid species or densities.

The Hall and Loveland invention improved the DeWath flowmeter by providing a flowmeter that measured flow accurately regardless of changes in fluid composition or temperature and by providing a flowmeter with a means for determining a change in velocity of sound of the fluid being measured.

In order to accomplish this, the Hall and Loveland acoustical wave flowmeter system had two spaced apart crystal transducers in the wall of the flowmeter conduit (sometimes called a cavity) to produce ultrasonic acoustic compressions at selected frequencies in the fluid within the cavity. The transducers were alternately switched into a transmit and a receive mode to generate upstream and downstream transmitted and received signals with an automatic means to adjust the transmitted frequencies to compensate for changes in velocity of the acoustic compressions in the fluid caused by changes in fluid composition and temperature. The electronic circuitry involved in the Hall and Loveland flowmeter system includes means for measuring and storing signals representing the phase difference between the transmitting transducer signal producing the acoustic compressions and the signal produced by the receiving transducer during each of two successive transmit/receive cycles. Circuit means were provided to determine the difference between the signals representing the two successive phase differences wherein the sign of the difference corresponds to the direction of the fluid flow and the magnitude of the difference corresponds to the rate of fluid flow through the flowmeter. Circuit means were also provided to add the two successive phase difference signals together to obtain a signal proportional to the velocity of sound in the fluid moving through the flowmeter. This latter signal indicated the change in composition of the fluid flowing through the meter.

In the DeWath flowmeter and the Hall and Loveland flowmeter system, the crystal transducers producing the energy in the fluid in the cavity, transmitted alternately with a period in between such transmissions called "dead" time. This dead time was an interval after the time one transmission ceased and before the other transmission started. Thus, one transducer would transmit and then, after a period of time, the other transducer would transmit, then, after a period of time, the first transducer would transmit again, and so on. It was thought that the acoustical energy in the fluid in the cavity must be allowed to decay to obtain the maximum results, hence the need for the dead times and, in an effort to reduce noise and offset drift, experiments in transmission times and dead times were made. The transmission times were changed and the dead times were changed slightly but to no avail. No matter what periods of time for the transmission and dead times were selected, the system did not improve.

This experimentation turned out to be the wrong approach, because it was found quite unexpectedly, that it was not necessary for the energy in cavity to decay and that, as a matter of fact, quite the opposite was true. If the dead times were eliminated altogether and if the second transmission followed immediately after the first transmission, the energy of the second transmission "swamped out" the energy of the first transmission. This discovery allowed the transmission times to be longer within the same transmit receive cycle as before, thus permitting the transmitting energy to equilibrate. Allowing the transmitted energy to equilibrate permitted more accurate measurements of the waves in the cavity. This resulted in an improvement in the accuracy of the measured zero and span (system gain).

More specifically, with the first transmission remaining ON a longer time and with the second transmission from the other transducer occuring immediately thereafter, and remaining ON for a longer time, energy in the fluid in the cavity has more time to equilibrate and thus more accurate measurements can be made. For example, in the Hall and Loveland patent, the transmission times for the transducers, shown as X and Y pulses, were of 2.5 milliseconds in length with an interval of dead time of 2.5 milliseconds in between. When one transducer was transmitting, a phase difference measurement was made after the transmission was half way through its time period, that is, after 1.25 milliseconds had elapsed. This was to allow for the energy to equilibrate in the flow cavity but, since this equilibration time was only 1.25 milliseconds long, inaccuracies in the measurement occurred. This was particularly critical when the flowmeter was subjected to different fluid constituents which would cause the transmitted energy to change. This inaccuracy was also apparent when zero measurements were attempted, ie, measurements of the energy in the cavity under conditions of no fluid flow. Without sufficient time to equilibrate, drift in zero measurements occurred.

With the increase in transmission time, the energy is now allowed 3.75 milliseconds to equillibrate before the phase measurement period of 1.25 milliseconds; all within the same time frame.

Accordingly, it is a primary object of this invention to provide a flowmeter system for measuring fluid flow and density with improved performance having less noise, increased span stability and with the minimization of drift in zero flow measurements.

Still another and more specific object of this invention is to provide a flowmeter system with increased transmission times to give the energy in the cavity produced by such transmissions more time to equilibrate, by eliminating dead periods between transmissions thus allowing the following transmission to swamp out the energy in the cavity produced by the prior transmission.

Another object of this invention is to provide a method of measuring fluid flow by providing a flowmeter with alternate first and second transmissions of energy into the fluid into the cavity with the second transmission and immediately following the first transmission thus swamping the energy in the fluid due to the first transmission.

SUMMARY OF THE INVENTION

The flowmeter system, and method, which meet the foregoing objects comprises means defining a path for confining the flow of a fluid medium therethrough, first and second transducers disposed along said flow path for generating acoustic compression waves in the flow medium between the transducers, said transducers transmitting energy upstream and downstream in said fluid medium with one transducer transmitting as soon as the first transmitter ceases to transmit, means for measuring the phase difference of the acoustic compression waves transmitted upstream relative to that received and for measuring the phase difference of the compression waves transmitted downstream relative to that received and for producing sum and difference voltage signals dependent upon the difference between the transmit and receive phases. The length of the transmission times being selected first to allow the energy in the fluid medium to equilibrate, to immediately swamp this energy by the transmission occurring immediat;ely following the first transmission, and to measure the phase difference near the end of each transmission period. Said system is a phase lock loop transmitter/receiver system and also includes means for automatically adjusting the frequency of the acoustic compression waves so that a constant compression wave length is maintained and for generating signals representing the direction and amount of flow as well as changes in the velocity of sound in the fluid flow in the system.

DETAILED DESCRIPTION

Figure 1:
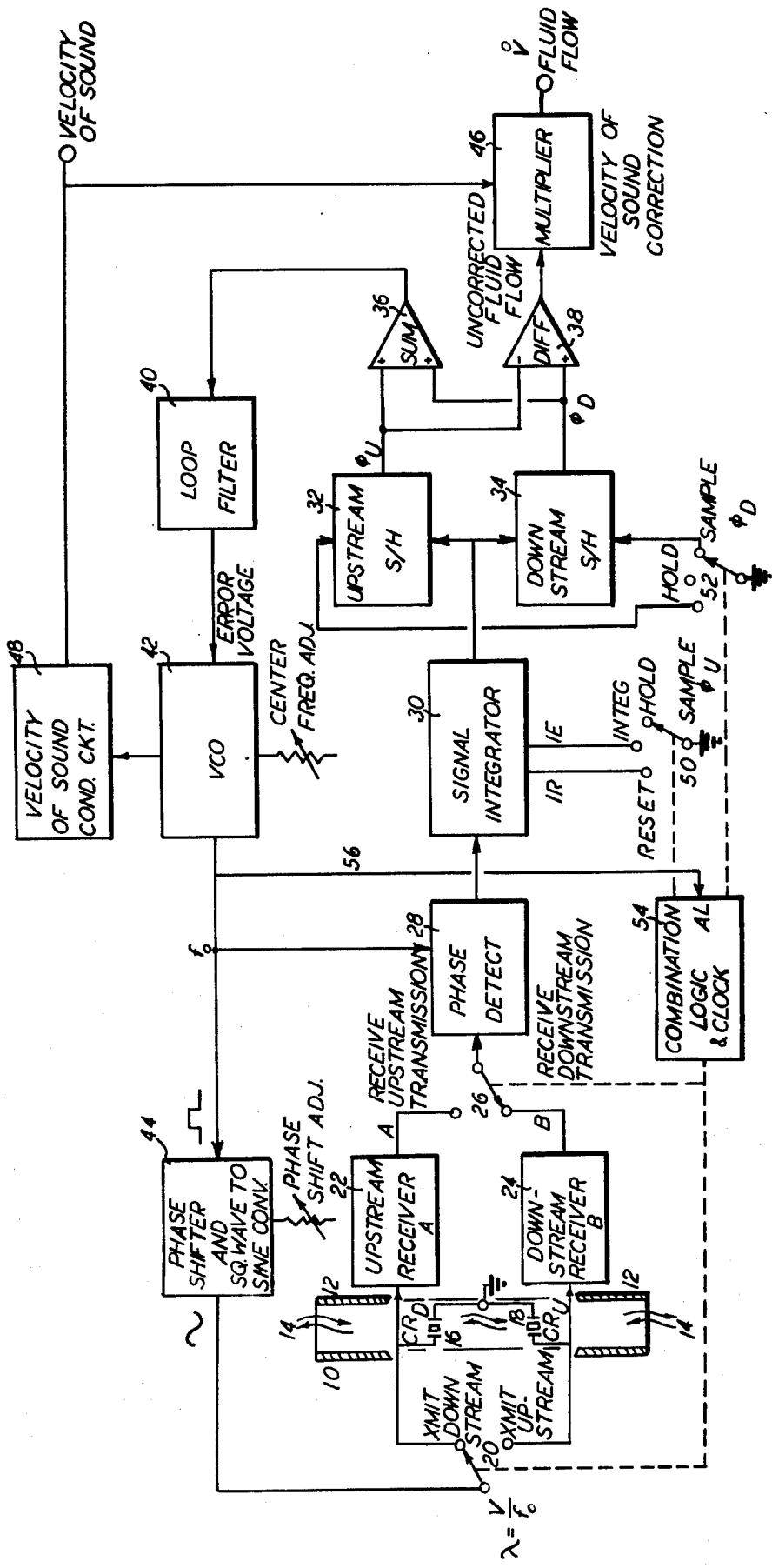
FIG. 1 is a schematic diagram of the flowmeter including the transducers and a block diagram of the electronic circuitry associated therewith.

FIG. 1 illustrates the flowmeter system of the present invention which includes a transducer assembly 10, shown in longitudinal section, which comprises a substantially cylindrical body having a central cylindrical opening, or bore 12, through which a fluid medium flows in both directions, as indicated by the arrows 14.

The transducer assembly is made generally in accordance with the description in the U.S. Patent to DeWath, supra, and is provided with spaced apart cylindrical crystal transducers whose inner diameters are substantially coextensive with the cylindrical bore 12 so that the wall is substantially uniform with no obstructions or cavities to provide a place for particulate matter to collect or to provide an impediment for the flow of fluid therethrough. The purpose of the transducers is described in the DeWath patent and in the Hall and Loveland patent, supra.

While the Hall and Loveland patent also showed and described, in great detail, control circuitry for operating the crystal transducers to accomplish the desired results, for the purpose of this invention, this circuitry has been simplified into block diagrams and reference can be made to this patent if more detailed information on the operation of the circuit is throught necessary.

As can be seen in FIG. 1, the two ultrasonic crystal transducers, represented by crystals 16 and 18, also identified as $CR_D$ and $CR_U$, are alternately each connected to the transmission control circuitry via a switching mechanism 20. When one transducer is connected to the transmission circuitry via switching mechanism 20, the other transducer is in the receive mode, the output of which, in turn, is connected via a second switching mechanism 26 to a phase detector 28, a signal integrator 30 and two sample-and-hold circuits 32 and 34, identified as upstream and downstream. The outputs of these two sample-and-hold circuits are connected to two operational amplifiers, one identified as a summing amplifier 36 and the other identified as a difference amplifier 38. The output of the summing amplifier 36 will indicate the velocity of sound and the output of the difference amplifier will indicate the magnitude and direction of the measured fluid flow. The output of the summing amplifier is connected to a loop filter 40 and to a voltage controlled oscillator 42 (VCO) which is connected back to the phase detector 28 and to a phase shifter and square-wave-to-sine wave converter 44. The phase shifter and converter 44 output is connected back to the first switching mechanism 20. Also like the summing amplifier, the output of the difference amplifier 38 is connected to the VCO 42 but through a multiplier 46 and a velocity of sound conditioning circuit 48. One output of the multiplier is the magnitude and direction of the fluid flow as stated above and the second output represents the relative velocity of sound. Shown connected by dotted lines are the first and second switching mechanisms 20 and 26 and two additional switching mechanisms 50 and 52 all under the control of a combinational logic and clock circuit 54. The circuit 54 alternates transmit and receive functions of the two crystal transducers 16 and 18, alternates the output of the upstream and downstream receivers 22 and 24, operates the integrator 30 between reset, integrate and hold functions and, finally, operates the upstream and downstream sample-and-hold circuits 32 and 34 through a sample, hold, and sample function.

As shown in this Figure, the ultrasonic crystals 16 and 18 are alternately switched into either the transmit or receive mode by the combinational logic circuit. Thus, while one crystal is receiving, the other crystal is transmitting.

For each transmit/receive cycle, the phase difference between the transmit signal and the received signal is detected by the phase detector 28. The average value is determined for each transmit/receive cycle by the integrator circuit 30 which goes through an integrate, hold and reset mode for each transmit/receive cycle. During each integrator hold period, the respective sample/hold circuit for the upstream phase and the downstream phase is ready to accept the new signal (sample mode) as data is available at the integrator output. The upstream and downstream sample/hold circuits are updated with new data at the end of each respective transmit/receive cycle and stores (holds) the information during the wait period.

In the differential amplifier 38, the stored values are then subtracted with the output indicating the direction and magnitude of the fluid flow. In addition, the same stored values are added together in the summing amplifier to determine if a common mode change has occurred in the fluid medium. A common mode change is caused by a change in the velocity of the ultrasound which, in turn, may be due to either temperature or fluid species change. The result is that the sum of the upstream and downstream data, held by the respective sample-and-hold circuits, changes in a manner which causes an error voltage signal at the voltage controlled oscillator (VCO) 42 input to change the transmit frequency in a direction which returns the wave length of the ultra-sound frequency to its original value thereby keeping the wave length constant.

The components of the control circuitry thus far described correspond to the control circuitry of the flowmeter system of the Hall and Loveland patent; it being understood that the foregoing is a simplification of the patented control circuitry. For example, the switching mechanism 20 in this disclosure is actually a combination of high speed transistorized switches comprised of transistors Q1 through Q8 controlled from the clock source by pulses X, Y, Q3 and $\overline{Q3}$ applied to their respective inputs, switching mechanism 26 are transistors Q9 and Q10 with pulses A & B applied to their respective inputs, etc. Other switching mechanisms exist in the circuitry of the patent through the operation of the clock source but otherwise the block diagrams correspond to the patented circuitry. It is understood that the other switching mechanisms were shown here to illustrate the operation of the circuitry in the block diagram only.

As hereinabove stated, this invention improves the patented system by increasing the transmission times of the crystal transducers, by eliminating the dead time periods and by measuring the phase differences in a later time period after initiation of transmission. This is accomplished in the combinational logic and clock which will now be described. In the Hall and Loveland patent a free running clock source, integrated circuit CD4047, was utilized to provide the gating pulses for the circuit and in this invention such a independent clock source may be used. However, for the reasons set forth in the copending application entitled "Flowmeter System with a Synchronous Clock for Generation of Timing Signals", a synchronous clock whose frequency is dependent upon the voltage controlled oscillator 42 is preferred and will be described in connection with this invention.

Thus, in FIG. 1, there is shown a conductor line 56 connecting the voltage controlled oscillator 42 to the combinational logic and clock circuit 54 thereby indicating the synchronization of the clock with the output with the VCO.

Figure 2:
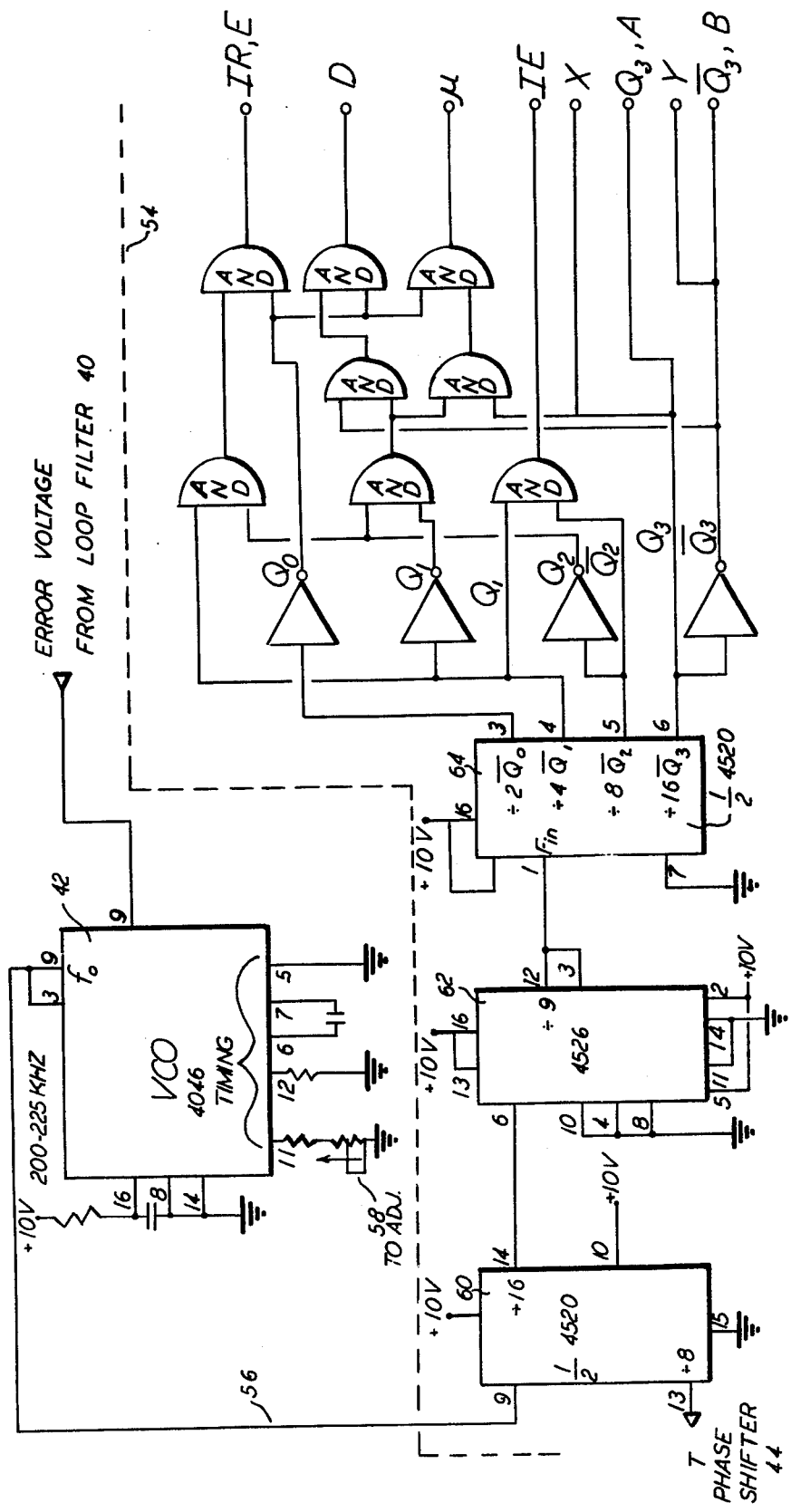
FIG. 2 is the detailed circuit diagram of a combinational logic and clock circuits for controlling operations of the system.

As shown in FIG. 2, the VCO is an integrated circuit (Phase Lock Loop) type 4046 to which is coupled a resistance and capacitor network 58 including a variable resistor for adjusting the open loop frequency. The VCO is coupled at input pin 9 to the loop filter 40 and VCO output pin 4 is connected to a series of integrated circuits 60, 62 and 64. Integrated circuit 60 is connected at pin 9 to the output of the VCO and its output pin 14,15 connected to input pin 6 of the integrated circuit 62. The output pin 12 of integrated circuit 62 is connected to pin 1 of integrated circuit 64 and pins 3, 4, 5 and 6 are outputs $\overline{Q0}$, $\overline{Q1}$, $\overline{Q2}$, and Q3, respectively. The signals produced at these pins are combined by the AND gates and inverters of FIG. 2 to produce the respective pulse streams as shown in FIG. 3.

The square wave signal at output pin 4 of the VCO, responsive to the error voltage applied at pin 9 and to the capacitor resistance network, operates to dynamically shift the frequency of the voltage controlled oscillator to respond to changes in the velocity of sound in the fluid for the reasons previously described.

Figure 3:
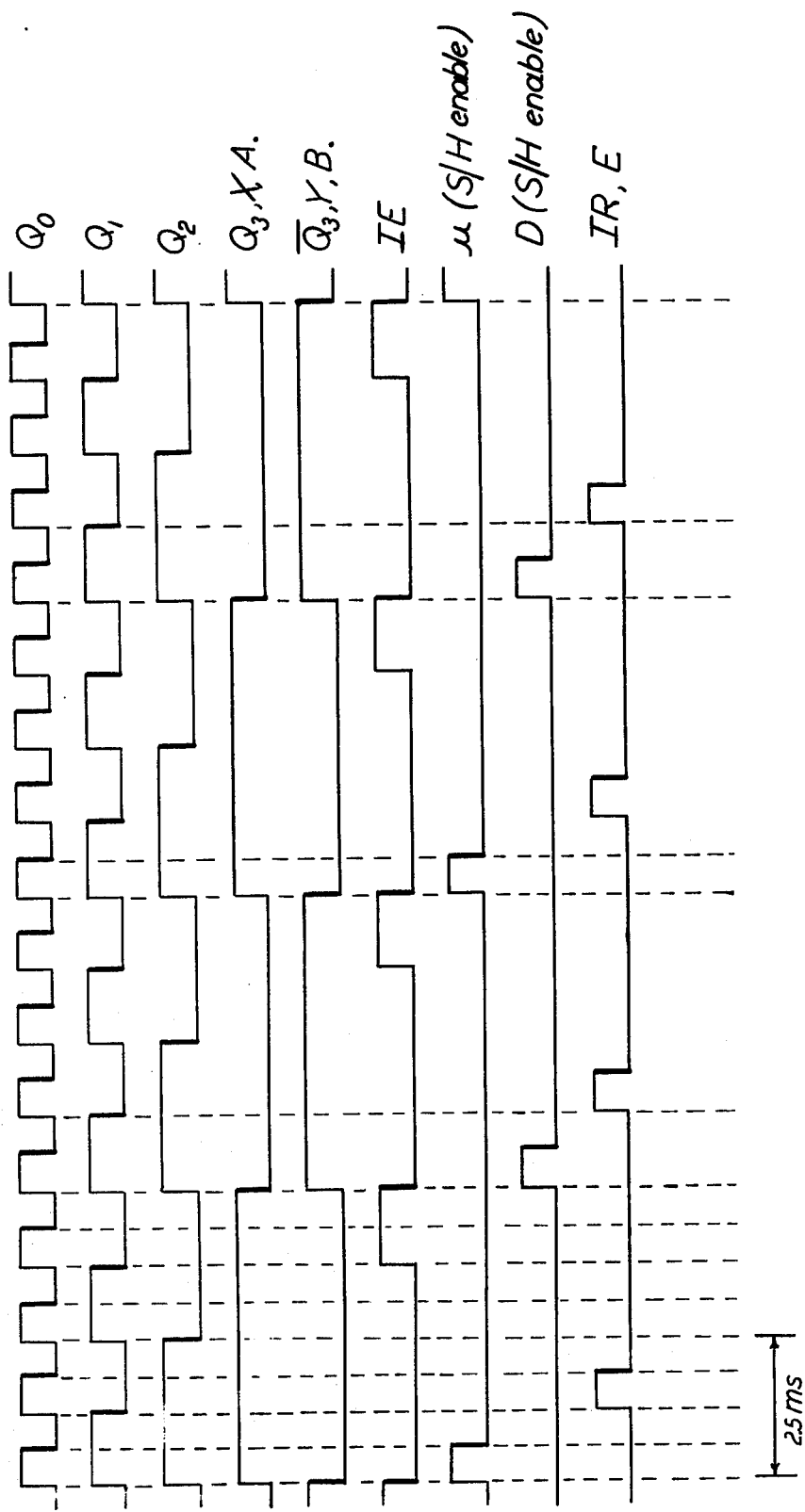
FIG. 3 is a timing pulse chart for the circuit of FIG. 2.

A review of the pulse streams shown in FIG. 3 shows that the transmit and receive pulses Q3 and $\overline{Q3}$ are combined with transmit pulses X and Y, respectively, and that the transmit pulses for each transducer begin and end immediately following the prior transmission for the reasons described above. Note that X and Y pulses are combined with Q3 and $\overline{Q3}$ pulses so that the upstream receiver will be ON while the downstream transmitter is transmitting and vice versa.

This figure shows also that the phase sampling (integrate enable) occurs during the last quarter of the transmission time thus giving three quarters of the transmission time to energy equilibration that is 3 times the equilibration time that was provided in the Hall and Loveland patent.

This results in a decrease in system noise and an improved span stability because the phase measurements of the received signal are more accurate since the acoustical energy has had time to equilibrate. Previously, insufficient time was allowed for the energy to equilibrate.

It should be apparent from the foregoing that this invention may be incorporated into the circuitry of the Hall and Loveland patent, supra, to improve its performance, or may be incorporated in circuitry improved by the incorporation of any one or all of the inventions identified under RELATED APPLICATIONS, supra, into a circuit to improve the performance of such circuitry. If the invention of the Application Ser. No. 224,783, now Pat. No. 4,345,479 is not used, of course, line 56, shown herein, would be omitted.

What is claimed is:

1. A flowmeter system comprising, in combination, transducer means for transmitting acoustic compression waves upstream for a selected time period and downstream for a selected time period in a fluid flowing in a path; the transmission of said upstream and downstream compression waves occurs immediately following one another circuit means for measuring the phase difference between the transducer means in the fluid flow path of the acoustic compression waves transmitted upstream the measurement of said phase difference occurring during the transmission of said upstream compression waves but only near the end of said time period and circuit means for measuring the phase difference between said transducer means in the fluid flow path of the acoustic compression waves transmitted downstream the measurement of said phase difference occurring during the transmission of said upstream compression waves but only near the end of said time period;

the measurement of said phase differences occurring near the end of the time period so that the acoustic energy of the transmitted compression waves is allowed to equilibrate, circuit means for producing a difference signal dependent on the difference between the two phase differences, the magnitude and sign of which being directly related to the instantaneous fluid flow rate and its direction; and circuit means for automatically adjusting the frequency of the acoustic compression waves to a frequency where a fixed wavelength distance, in the fluid flow medium, occurs across the path of the transducer means.

2. A flowmeter system comprising, in combination:

transducer means for transmitting acoustic compression waves upstream and downstream in a fluid flowing in a path;

the transmission of said upstream and downstream waves occurring immediately following one another, circuit means for measuring the phase difference between the transducer means in the fluid flow path of the acoustic compression waves transmitted upstream after the acoustic energy of said compression waves has equilibrated that is, only near the end of but during the transmission of said upstream compression waves and circuit means for measuring the phase difference between said transducer means in the fluid flow path of the acoustic compression waves transmitted downstream after the acoustic energy of said compression waves has equilibrated, that is only near the end of but during the transmission of said downstream compression waves.

circuit means for producing a difference signal dependent on the difference between the two phase differences, the magnitude and sign of which being directly related to the instantaneous fluid flow rate and its direction; and circuit means for automatically adjusting the frequency of the acoustic compression waves to a frequency where a fixed wavelength distance, in the fluid flow medium, occurs across the path of the transducer means.

3. A flowmeter system for measuring a fluid along a path comprising, in combination:

means defining a path for confining a fluid flow;

a first and second transducer disposed along said path;

a transducer control circuit coupled to said first and second transducers to cause said first transducer to produce first acoustic compressions in the fluid and said second transducer to produce a first received signal when said first acoustic compressions are sensed thereby during a first transmit-receive cycle and to cause said second transducer to produce second acoustic compressions in the fluid and said first transducer to produce a second received signal when said second acoustic compressions are sensed thereby during a second transmit-receive cycle;

said control circuit also including:

means to switch from said first to said second transmit-receive cycle immediately following cessation of said first transmit-receive cycle;

first measurement means to measure a first phase difference comprising the phase difference between the first acoustic compressions produced at said first transducer and said first received signal produced by said second transducer during each said first transmit-receive cycle;

means to render said first measurement means operative to measure said first phase difference during only the latter portion of the transmit-receive cycle which begins when at least three-fourths of the total transmission period has occurred to enable the acoustic energy of the acoustic compressions to have reached an adequate level for accurate phase measurement;

second measurement means to measure a second phase difference comprising the phase difference between the second acoustic compressions produced at said second transducer and said second received signal produced by said second transducer during each said second transmit-receive cycle;

means to render said second measurement means operative to measure said second phase difference during only the latter portion of the transmit-receive cycle which begins when at least three-fourths of the total transmission period has occurred to enable the acoustic energy of the acoustic compressions to have reached an adequate level for accurate phase measurement;

difference means responsive to said first and said second measurement means to produce a difference signal whose magnitude equals the difference between one said first phase difference and one said second phase difference wherein the magnitude of said difference signal is directly related to the instantaneous fluid flow rate and the algebraic sign of said difference signal represents the direction of fluid flow along the path; and means to automatically adjust the frequency of the acoustic compressions produced by each said transducer to a frequency where a fixed wavelength distance, in the flow medium, occurs across the distance of either said transducer, thereby maintaining operation at the acoustic resonance to maximize the magnitude of the received signal produced at the other transducer so that said difference signal output is insensitive to the velocity of sound in the fluid.

4. A method of measuring the flow of fluid in a confined flow path comprising the steps of:

transmitting acoustic compressions for a selected period of time at a first point in said confined flow path into said fluid, transmitting acoustic compressions for a selected period of time at another point in said flow path into said fluid immediately following the cessation of transmission of acoustic compressions at said first point thereby swamping the acoustic compressions in said fluid transmitted therein at said first point, waiting a selected period of time of at least three-fourths of but during the transmission period at said first point and then measuring the acoustic compressions in said fluid at said second point before the cessation of transmission of acoustic compressions at said first point, waiting a selected period of time of at least three-fourths of but during the transmission period at said second point and then measuring the acoustic compressions in said fluid at said first point before the cessation of transmission of acoustic compressions at said second point, and determining the phase difference between the acoustic compressions received and the acoustic compressions transmitted and the rate and direction of flow of fluid between the points from said measurements.

5. A method of measuring the flow of fluid in a confined flow path comprising the steps of:

transmitting acoustic compressions for a predetermined period at a first point in said confined flow path into said fluid, transmitting acoustic compressions for a predetermined period at a second point in said confined flow path into said fluid, the transmission period at the said second point beginning immediately after the termination of the transmission period at the first point, allowing the acoustic compressions in said fluid transmitted at said first point to equilibrate and measuring the phase difference between said acoustic compressions received at a second point and those transmitted at the first point by delaying said measurement until at least three-quarters of the transmission period at said second point has expired, and determining the rate and direction of flow of fluid between the points from said measurement.

6. The method as claimed in claim 5 further including the steps of:

transmitting acoustic compressions for a predetermined period at said first point in said flow path, the transmission period at said first point beginning immediately after the termination of the transmission period at said second point, and allowing the acoustic compressions in said fluid transmitted at said first point to equilibrate and measuring the phase difference between said acoustic compressions received at said second point and those transmitted at the second point by delaying said measurement until at least three-fourths of the transmission period at said first point has expired and determining the rate and flow of fluid between the latter points from said measurements.

7. The method as claimed in claim 6 further including the step of adjusting the frequency of energy transmission to a frequency where a fixed wavelength occurs between said first and second points regardless of the fluid species or density.

8. A flowmeter system for measuring a fluid along a path comprising, in combination:

means defining a path for confining a fluid flow;

a first and second transducer disposed along said path;

a transducer control circuit coupled to said first and second transducers to cause said first transducer to produce first acoustic compressions in the fluid and said second transducer to produce a first received signal when said first acoustic compressions are sensed thereby during a first transmit-receive cycle but only after a delay of at least three-quarters of said cycle and to cause said second transducer to produce second acoustic compressions in the fluid and said first transducer to produce a second received signal when said second acoustic compressions are sensed thereby during a second transmitreceive cycle but only after a delay of at least three-quarters of said cycle;

said delays allowing the energy in said fluid by said acoustic compressions to reach stabilization for accurate phase comparison and minimize the effects of reflection;

means for switching from said first to said second transmit-receive cycle immediately following cessation of said first transmit-receive cycle;

said control circuit also including:

first measurement means to measure a first phase difference comprising the phase difference between the first acoustic compression produced at said first transducer and said first received signal produced by said second transducer during each said first transmitreceive cycle;

second measurement means to measure a second phase difference comprising the phase difference between the second acoustic compression produced at said second transducer and said second received signal produced by said second transducer during each said first transmit-received cycle;

difference means responsive to said first and said second measurement means to produce a difference signal whose magnitude equals the difference between one said first phase difference and one said second phase difference wherein the magnitude of said difference signal is directly related to the instantaneous fluid flow rate and the algebraic sign of said difference signal represents the direction of fluid flow along the path;

means to automatically adjust the frequency of the acoustic compressions produced by each said transducer to a frequency where a fixed wavelength distance, in the flow medium, occurs across the distance of either said transducer, thereby maintaining operation at the acoustic resonance to maximize the magnitude of the received signal produced at the other transducer so that said difference signal output is insensitive to the velocity of sound in the fluid. 3

* * * * *